R. A. BROOMAN.
APPLICATION OF GUTTA PERCHA.
No. 5,592. Patented May 23, 1848.
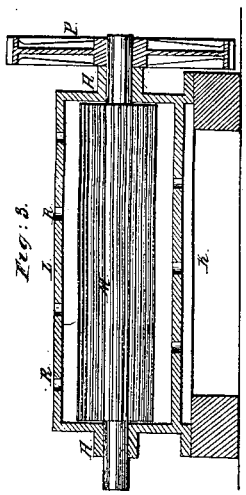
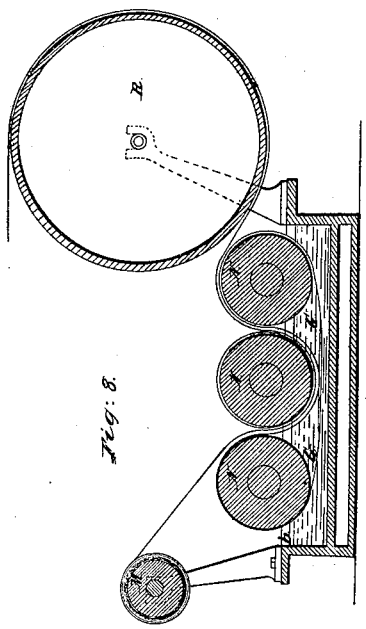
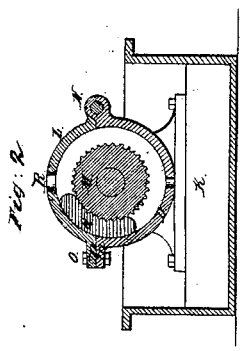
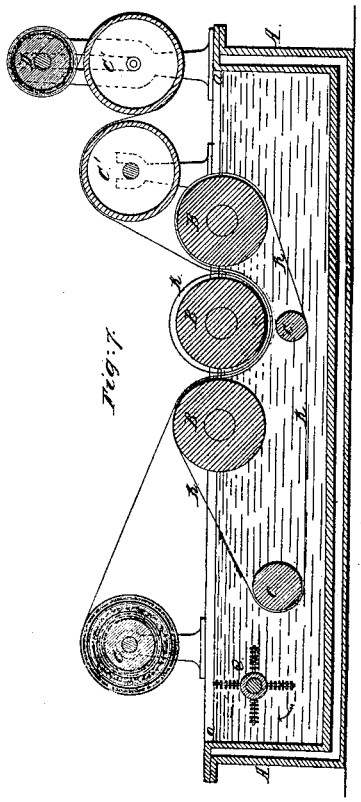
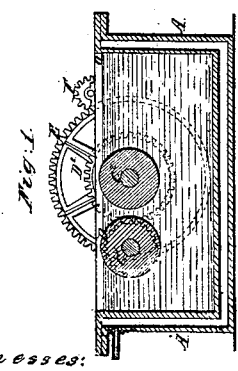

UNITED STATES PATENT OFFICE.

RICHD. A. BROOMAN, OF LONDON, ENGLAND.

MAKING ARTICLES OF GUTTA-PERCHA BY MOLDING, STAMPING, OR EMBOSSING.

Specification of Letters Patent No. 5,592, dated May 23, 1848.

*To all whom it may concern:*

Be it known that I, RICHARD ARCHIBALD BROOMAN, of Fleet street, in the city of London, England, gentleman, a subject of the Queen of Great Britain, have invented certain new and useful applications of the substance called gutta-percha alone or in combination with other substances to certain manufacturing uses and purposes and the modes or processes of preparing, combining, and applying the same; and I, the said RICHARD ARCHIBALD BROOMAN, do hereby declare that the nature of my said invention and in what manner the same is to be performed are fully described and ascertained in and by the present specification thereof, reference being had to the drawings hereunto annexed and making part of this specification.

Whereas there has been recently imported from the East Indies a natural resin or resin like substance or mastic not previously known or used in the arts and manufactures called gutta percha (sometimes gutta tuban) which has been found to possess properties that render it peculiarly adapted to the effecting of improvements in the arts: First, it is of a highly combustible quality, being chiefly composed of carbon and hydrogen while at the same time it inflames only at a high degree of heat and is not injuriously affected by any known degree of atmospheric heat. Second, it is soluble in essential oils but resists to a great extent the action of grease and unctious oils. Third, it mixes with paints pigments and most other coloring matters. Fourth, it is repellent of and unaffected by cold water or damp. Fifth, it may be so softened by immersion in hot water or by exposure to steam or hot air as to be capable without further treatment of being kneaded or molded or rolled out or pressed into any desired shape and to any extent of tenuity. Sixth, it is of a strongly adhesive or agglutinating quality and when dry is free from stickiness. Seventh, in the dry or solid state it is flexible of great tenacity and to a slight degree elastic. Eighth, it is impermeable to and not injuriously affected by atmospheric air. Ninth, it is in a pure state nearly inodorous. Tenth, it is little if at all injured by use (except as a fuel) and may after it has been employed in a manufactured state be recovered or renovated and manufactured anew. And lastly it is fibrous. In some of these properties namely its adhesive and water and air repellent properties gutta percha resembles caoutchouc but it is advantageously distinguished from it in its freedom from stickiness when dry in its not being so affected by atmospheric heat or by unctuous oils, in its being workable by means of hot water alone, and in its being fibrous.

Now the nature of the said invention consists in the application of the said natural resin or resin like substance or mastic either by itself or in combination with other substances to certain manufacturing uses and purposes hereinafter specified. And the manner of carrying the said invention into effect is as follows.

*Preparation of the gutta-percha.*—To prepare gutta percha for application to manufacturing purposes it is first freed from the foreign matters with which it is usually found intermixed in the state in which it is imported by repeated washings in manner following. It is soaked for a short time in hot water in order to make it pliable and then passed 5 or 6 times or oftener through a cleansing machine constructed as shown in the sectional elevation of it given in Fig. 1 of the drawings hereunto annexed.

A is a double sided tank filled to about the height of the line $a$, $a$, with water which is kept at a temperature of from 180° to 200° by means of steam or hot water introduced into the space B between the two sides of the tank.

$C'$, $C^2$, are 2 parallel steel or iron rollers of equal diameters which are mounted in suitable bearings and fixed in such a position as to be about three fourths immersed in the water in the tank.

$D'$, $D^2$, are two wheels affixed to the axis of the rollers $C'$, $C^2$, which work into one another and give motion to these rollers the wheel $D^2$ being twice the diameter of the wheel $D'$ in order that it may serve as a sort of drag on the latter.

F is a pinion which gives motion to a large toothed wheel E which drives the rollers $C'$, $C^2$. The gutta percha being removed from the hot water is passed between the rollers $C'$, $C^2$, (as indicated by the red line) and this process is repeated till all the foreign matters have been squeezed out of it and it has been reduced to a sheet of more or less thickness.

The rollers $C'$, $C^2$ are provided with adjusting screws (after the well known mode adopted in flatting mills) by which the distance between them may be diminished as the process proceeds and diminished to such an extent as to produce pieces of the gutta percha of any required degree of thickness. The dragging action which the wheel D² exerts on the wheel D' is useful in protracting or staying the process of the material while it is being squeezed between the two rollers. The refuse matters resulting from this cleansing process float on the surface or fall to the bottom of the tank.

*Plastic applications.*—When the gutta percha is intended to be used in the plastic state it is next subjected to the operation of a kneading machine such as represented in Figs. 2 and 3 the former being an end elevation in section and the other a side view partly in section.

K is a framework or hollow case in which is mounted a hollow iron cylinder L containing within it a grooved roller M of considerably smaller diameter the axis of which passes through the end or bearings H, H, of the cylinder the top of the cylinder is divided from the rest so as to form a lid turning backward on a hinge at N when opened and made fast in front when closed by bolts O passed through the two projecting flanges m, m. A rotary motion is given to the grooved roller M by a wheel P fixed on one end of its axis and the roller M derives it motion through the medium of a pinion from a steam engine or any other first mover. The lid being opened a ball or mass of gutta percha (formed by working up together by hand and in hot water a number of the cleansed pieces) of sufficient size to fill about one third of the space between the cylinder L and roller M is introduced as shown at Q and the lid fastened down motion is then given to the roller M the flutes of which serve not only to carry around the mass of gutta percha but to knead it thoroughly—the process is continued until the mass becomes perfectly ductile and the length of time required for this purpose varies from an hour to an hour and a half more or less according to the quality of the gutta percha, some sorts being more stubborn than others the heat ultimately evolved in the process is considerable but it will in most cases be found necessary to aid the process at the commencement by inclosing the case K in a tank of hot water as shown in Fig. 2 or by introducing steam by a pipe into the cylinder L.

When it is desired to give to the mass of gutta percha a greater degree of elasticity than is natural to it I mix up and incorporate with it while it is going through the kneading machine either a portion of caoutchouc or a portion of sulfur or portions of both caoutchouc and sulfur.

The following are good average proportions about three parts of caoutchouc for every six parts of gutta percha or one part of sulfur for every eight parts of gutta percha or two parts of caoutchouc and one part of sulfur for every six parts of gutta percha. When caoutchouc however is employed to increase the elasticity of the gutta percha a degree of heat of not less than 150° Fahrenheit is necessary to effect the amalgamation of the two substances. The caoutchouc is most conveniently introduced into the machine at the same time with the gutta percha but the sulfur should be dropped into and upon the gutta percha from time to time and in small quantities at a time through the small doors R in the top of the cylinder L. The gutta percha takes up the other materials readily and the whole are at the end of the process thoroughly amalgamated.

Should it be desired to give any color to the mass of gutta percha to render it the better adapted to the purposes to which it is to be applied the requisite pigment or coloring matter is introduced in the same way as the sulfur and also in small quantities at a time. The color penetrates every part of the mass and becomes perfectly amalgamated and identified with it.

The gutta percha may be also improved in smoothness by incorporating with it some pulverized French or Turkey chalk or other soft powder adding it in the same way as the sulfur or colors. Os should it be desired to render it rough and abrasive it may be mixed up with some ground emery sand or other hard substance in a granular state. By itself and in one or other of the said states it may be manufactured by molding, stamping or embodying into various articles of use as glass and picture frames, cornices moldings and other architectural ornaments, paneling mosaics, &c., buttons studs counters labels balls, &c., bracelets armlets garters rings and other circular articles, ornamental harness and sadlery work and all other ornamental or figured work or anything to be formed by molding in the plastic state, or embossing or stamping.

*Granular applications.*—I take the gutta percha of any of the varieties before described that is to say either plain or sulfurized or colored and rasp it down to a powder. I then apply it in this state to the taking of casts of busts cornices and other works of art in round or curved forms and to the producing of impressions in relief form flat surfaces engraved in intaglio or perforated through and through of any given pattern. When casts of busts, &c., are to be taken the mold is filled with the grains or powder of the gutta percha and then heated till the gutta percha becomes reduced to a mass sufficiently ductile to be pressed into all parts of the mold. When impressions in relief from flat surfaces engraved or perforated as above are to be taken the surface is laid upon a flat table and the powder sprinkled rather thickly over it a straight edge is then drawn across the surface which causes all the sunken parts or holes to be filled up and removes any superfluous powder from the raised parts. The surface is then subjected to a heat sufficient to soften the gutta percha. When the piece of cloth leather paper or any other substance on which it may be desired to take the impression in relief is laid upon the surface and the pressure applied to it by a roller or otherwise the gutta percha leaves the sunken parts or holes and attaches itself to the cloth or other substance which then exhibits an exact copy in very bold and durable relief of the original subject. All the various articles required can be formed by pressing masses of gutta percha into molds in the well known manner of molding by pressure. And all the articles produced by either or all the modes herein specified are flexible to a degree which will admit of bending and applying them to various purposes without breaking, and they also admit of nailing or cementing by simply heating and pressing.

All the articles which have been hereinbefore enumerated or referred to as being formed of gutta percha or of gutta percha in combination with other substances possess in common this valuable property that after they have been in use the gutta percha may be recovered from them with but little if any loss and restored to a state fit for manufacturing into new articles of the same or any other description. And having now described the nature of the said invention and in what manner the same is to be performed, I declare that

What I claim an exclusive right to and desire to secure by Letters Patent is—

The manufacture of the various articles hereinabove enumerated and all others of a similar or like nature by molding, stamping, or embossing, to give to such articles the form required to be retained whether useful or ornamental, whereby I am enabled to produce articles useful or ornamental or both at less cost, more durable, more easily applied, and in short more valuable than when made of any other known substance, and this I claim whether made of gutta percha alone or in combination with such other substances, as are herein specified.

R. A. BROOMAN.

Witnesses:
G. H. BYERLEY,
M. HENRY.